US006863718B2

(12) United States Patent
Lamborn et al.

(10) Patent No.: US 6,863,718 B2
(45) Date of Patent: Mar. 8, 2005

(54) PHOSPHONIC ACID DERIVATIVE TREATMENT OF METALLIC FLAKES

(75) Inventors: H. Taylor Lamborn, Shillington, PA (US); Robert E. Souerwine, Slatington, PA (US); Craig B. Keemer, Reading, PA (US)

(73) Assignee: Silberline Manufacturing Co., Inc., Tamaqua, PA (US)

( * ) Notice: Subject to any disclaimer, the term of this patent is extended or adjusted under 35 U.S.C. 154(b) by 103 days.

(21) Appl. No.: 10/004,486

(22) Filed: Oct. 31, 2001

(65) Prior Publication Data

US 2003/0097957 A1 May 29, 2003

(51) Int. Cl.$^7$ ................................................ C09D 5/08
(52) U.S. Cl. ............................... 106/14.12; 106/14.05; 106/14.44; 106/403; 106/404; 428/470
(58) Field of Search ......................... 106/14.05, 14.12, 106/14.44, 403, 404; 428/470

(56) References Cited

U.S. PATENT DOCUMENTS

| | | | |
|---|---|---|---|
| 4,350,535 A | 9/1982 | Ishijima et al. | |
| 4,408,231 A | 10/1983 | Kondis et al. | |
| 4,419,134 A | 12/1983 | Ishijima et al. | |
| 4,453,982 A | 6/1984 | Wilfinger et al. | |
| 4,565,716 A | 1/1986 | Williams, Jr. et al. | |
| 4,624,112 A | 11/1986 | Proctor | |
| 4,717,424 A | 1/1988 | Wilfinger et al. | |
| 4,869,754 A | 9/1989 | Kawabe et al. | |
| 5,011,533 A | 4/1991 | Kuwajima et al. | |
| 5,057,156 A | 10/1991 | Kuwajima et al. | |
| 5,091,451 A | 2/1992 | Kahle, II et al. | |
| 5,104,922 A | 4/1992 | Chang | |
| 5,215,579 A | 6/1993 | Keemer et al. | |
| 5,429,674 A | 7/1995 | Lamers et al. | |
| 5,466,286 A | 11/1995 | Briselli et al. | |
| 5,470,385 A | 11/1995 | Keemer et al. | |
| 5,502,113 A | 3/1996 | Antonelli et al. | |
| 6,558,796 B2 * | 5/2003 | Huybrechts et al. | 428/414 |

FOREIGN PATENT DOCUMENTS

| | | |
|---|---|---|
| EP | 0 286 265 A1 | 10/1988 |
| EP | 000581235 A1 * | 7/1993 |
| EP | 0 391 971 | 3/1994 |
| GB | 1 541 968 | 3/1979 |
| WO | WO 95/04783 | 2/1995 |
| WO | 99/06450 | 2/1999 |

* cited by examiner

*Primary Examiner*—Anthony J. Green
(74) *Attorney, Agent, or Firm*—Merchant & Gould P.C.

(57) ABSTRACT

Metal pigment particles are treated with a product resulting from the reaction between an organic phosphonic acid with an amine having at least one organic group containing at least six carbon atoms to inhibit their reactivity to water. The treated metal particles can be used in coating and ink compositions. Additionally, the treated metal particles can be used to formulate pastes and dispersions that are provided to a coatings manufacturer.

77 Claims, No Drawings

PHOSPHONIC ACID DERIVATIVE TREATMENT OF METALLIC FLAKES

FIELD OF THE INVENTION

The present invention is directed to the treatment of metal pigment particles. The metal pigment particles may be used in a wide variety of coating compositions; including automotive, general maintenance, industrial, and roof coating systems, as well as in ink systems.

BACKGROUND OF THE INVENTION

A number of methods have been developed for treating metal flake pigments to inhibit their reactivity with water, thereby rendering them usable in aqueous coatings and ink systems. Metal pigment particles readily react with water to generate hydrogen gas. This reaction is a safety hazard due to the generation of flammable hydrogen gas. Additionally, the reaction between the metal pigment particles and water degrades the aesthetic (optical) properties of the metal pigment particles by converting them to an oxidized form, reducing their bright, sparkling effect.

Due to the extremely high ratio of surface area to mass, metal pigment particles or flakes are much more reactive than bulk metal items. As such, less acidic organophosphorous reagents are generally used instead of phosphorous or phosphoric acid to treat the particles to inhibit their reactivity to water. These reagents typically include: phosphites (organic esters of phosphorous acid); phosphates (organic esters of phosphoric acid); phosphonic acids (where the organic moiety is directly bound to the phosphorus by a C—P bond); or neutralized versions of these materials. The treatments can be carried out by either adding the organophosphorous reagent to the coating or ink system prior to or immediately after adding the metallic flake pigment (referred to herein as an "in-situ treatment"), or by separately combining the organophosphorous reagent with the metal pigment and providing the treated flake paste to the coating or ink manufacturer (referred to as a "pre-passivation treatment").

While phosphites, phosphates, phosphonic acids, and their respective neutralized versions have been shown to inhibit the reactivity of metallic flake pigments to water, their use has several drawbacks. For example, metal pigment particles treated with many of the reagents still result in the generation of fairly high levels of hydrogen gas when contacted with an aqueous medium, limiting their utility. This is particularly true for metal pigment particles treated with phosphates and phosphites. Additionally, when these reagents are used in large amounts to treat metal pigment particles in a coating, they can negatively affect other properties of the coating such as the coating's ability to adhere to a surface.

Many phosphonic acids and some phosphites and phosphates, when used as a pre-passivation treatment, due to the close proximity of the aluminum flakes to one another are often so reactive that the flakes are deteriorated. This leads to a reduction of brightness, loss of hiding power, and the formation of three-dimensional "seed" particles that protrude through the paint film. Neutralizing these aggressive materials with ammonia or with the low molecular weight amines commonly used in the coatings industry will, in some cases, prevent this deterioration, but in other cases it has no effect. Even when the neutralization is effective, it generally causes the inhibition reaction to proceed more slowly, so that an aging period of several weeks or even months is needed in order to develop the full benefits of the treatment. This aging period is undesirable in the manufacturing process of the metal pigment paste, as the metal pigment paste needs to be stored in a warehouse and periodically tested to ensure that it is ready for shipment to the end user.

SUMMARY OF THE INVENTION

In accordance with the present invention, metal pigment particles useful for coatings and ink compositions are treated with a reagent, also referred to here as a salt, resulting from the reaction of an organic phosphonic acid with an amine containing at least one organic group of C6 or higher. This reagent or salt provides highly desirable protection for metallic flakes against attack from water in an aqueous resin system, and provides advantages over other previously used organophosphorous reagents. It is more effective at reducing hydrogen gas generation than organic acid phosphate esters, does not require the aging period needed with neutralized phosphates or phosphites, and is less likely to cause the flake deterioration commonly seen when using a phosphonic acid in a pre-passivation treatment.

Metal pigment particles are treated by contacting a composition having metal pigment particles with a salt resulting from the reaction of an organic phosphonic acid reacted with an amine containing at least one organic group of C6 or higher. A coating composition according to an embodiment of the present invention includes the treated metal particles and a suitable carrier for an aqueous coating composition. Similarly, a paste includes the treated metal particles and a liquid, such as, but not limited to, mineral spirits. In making the coating composition, the salt can be added before or after the metal particles are added to the carrier.

In another embodiment of the present invention, a metal pigment particle dispersion includes metal pigment particles treated with a salt resulting from the reaction of an organic phosphonic acid reacted with an amine containing at least one organic group of C6 or higher. To form the dispersion, the treated metal pigment particles are mixed with a suitable dispersion carrier, and are capable of remaining in a dispersed state in the dispersion carrier without separation. The dispersion carrier may be liquid at room temperature and should be compatible with a vehicle for forming a coating composition.

DESCRIPTION OF THE PREFERRED EMBODIMENT

It should be noted that throughout the description, the terms "including", "having", and "containing" are used synonymously with "comprising". The terms "approximately" and "about" refer to a deviation of ±5% from a given value.

In accordance with the present invention, metal pigment particles are treated with a reagent, also referred to here as a salt, resulting from the reaction of an organic phosphonic acid reacted with an amine containing at least one organic group of C6 or higher to increase the resistance of the metal particles to attack from an aqueous medium, for example the vehicle or carrier of an aqueous coating composition. Such vehicles or carriers include, but are not limited to, the following: acrylic emulsions, water reducible alkyl resin systems, water reducible alkyl/melamine cross-linked systems, waterborne epoxy systems, polyester emulsions, and water reducible polyester/melamine coatings. As a result, the metal particles are rendered suitable for use in aqueous coating and ink systems. Metal pigment particles that are treated with the salt generate significantly reduced levels of hydrogen gas when contacted with an aqueous medium, do not require an aging period, and do not deteriorate, as compared to metal pigment particles that are treated with other organophosphorous compounds.

In the present invention, aluminum, zinc, or bronze particles may be employed. Preferably, the particles are aluminum particles. The pigment particles are generally provided in flake form, although, in some cases, spherical or other forms may be used. The metal pigment particles generally will have a median particle size of approximately 1–500 microns, preferably 5–100 microns. Additionally, the methods of treating metal pigment particles according to the instant invention may be applicable to other types of particles including, but not limited to, iron. Additionally, the pigment particles may be in the form of leafing grades or non-leafing grades, depending on the particular application.

An organic phosphonic acid is a compound with the following formula:

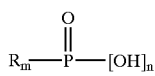

Where:
  m=1 or 2
  n=1 or 2
  and m+n=3

In most cases, m will equal 1 and n will equal 2; that is, the phosphonic acid will have two acid groups per molecule. R may be any organic moiety; alkyl, alkenyl, alkynyl (linear, branched, or cyclic; this will apply throughout); aryl; or alkylaryl; and may contain one or more functional groups including, but not limited to, hydroxyl, carbonyl, carboxyl, epoxy, ether, amino, nitro, nitrile, thio, silyl, sulfo, phosphato, halo, and the like. Preferably, R will contain at least six carbon atoms, as this increases the hydrophobicity of the treatment and provides increased inhibition of the water-metal reaction.

The amine that is reacted with the phosphonic acid is a compound with the following formula:

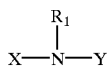

$R_1$ may be any organic moiety containing at least six carbon atoms; alkyl, alkenyl, alkynyl (linear, branched, or cyclic; this will apply throughout); aryl; or alkylaryl; and may contain one or more functional groups including, but not limited to, hydroxyl, carbonyl, carboxyl, epoxy, ether, amino, nitro, nitrile, thio, sulfo, phosphate, halo, and the like. Preferably, $R_1$ will contain at least eight carbon atoms. X and Y are each independently either hydrogen or any organic moiety containing from one to twenty carbon atoms; alkyl, alkenyl, alkynyl (linear, branched, or cyclic); aryl; or alkylaryl; and may contain one or more functional groups including, but not limited to, hydroxyl, carbonyl, carboxyl, epoxy, ether, amino, nitro, nitrile, thio, sulfo, phosphato, halo, and the like. The amine may be a primary, secondary, or tertiary amine.

The reaction between the phosphonic acid and the amine may be carried out either neat or in a solution of water or organic solvent, or any combination thereof, in which both the amine and the phosphonic acid are soluble. As a simple acid-base neutralization, there are no specific requirements as to reaction temperature or pressure, and no need for catalysis. The amount of amine used in the reaction ranges from 0.25 to 2.0 moles per mole of phosphonic acid. Preferably, the amount of amine ranges from 1.0 to 2.0 moles per mole of phosphonic acid. Using less amine may not effect sufficient neutralization of the acid groups to prevent flake deterioration, and using more amine may not produce any additional benefits. The reagents are stirred together for a period of time sufficient for the reaction to be completed. Generally, the reagents are stirred anywhere from five minutes to eight hours.

The reaction product, also referred to as the salt, of the above neutralization reaction can be used as a pre-passivation treatment for metal flake particles in a paste reduction process. The general formula of the reaction product is as follows:

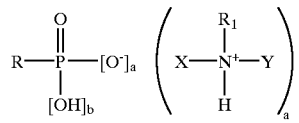

where a ranges from 0.25 to 2.0, b ranges from 0.0 to 1.75, and a+b=2.0. Preferably, a ranges from 1.0 to 2.0, and b ranges from 0.0 to 1.0. R and $R_1$ are selected from the group consisting of alkyl, alkenyl, alkynyl, aryl, and alkylaryl and comprise at least six carbon atoms. Preferably, $R_1$ comprises at least eight carbon atoms. X and Y are each independently either hydrogen or a moiety having from 1 to 20 carbon atoms selected from the group consisting of alkyl, alkenyl, alkynyl, aryl, and alkylaryl. Optionally, R, $R_1$, X, and Y may each contain one or more of the following functional groups including, but not limited to, hydroxyl, carbonyl, carboxyl, epoxy, ether, amino, nitro, nitrile, thio, silyl, sulfo, phosphate, halo, and the like.

The reaction product or salt may be used to treat a paste including the metal pigment particles. Such pastes may be, for example, about 55–95% by weight (preferably 60–85%) metal particles in mineral spirits or other solvents. The paste is charged into a mixer, and the salt is added thereto. The salt may be added to the paste either neat or in a solution of water or organic solvents. A mixed solvent system also may be employed.

Any solvent or solvent system in which the reaction product is soluble and which is compatible with the intended coating composition may be used. For example, the solvent or solvent system may include, but is not limited to, one or more of the following types of compounds: aliphatics, aromatics, nitroparaffins, alcohols, esters, aldehydes, ketones, ethers, glycol ethers, glycol ether acetates, carbonates, and pyrrolidones. Preferably, the solvent will be miscible with water, increasing the compatibility of the metal flake paste with aqueous coating carriers or vehicles.

The salt or salt solution is added in an amount sufficient to provide 0.5–30%, preferably 1–15%, of salt with respect to the weight of metal particles. The total amount of liquid added to the paste generally will yield a final non-volatile content of about 50–80% by weight of the mixture. The mixture is mechanically agitated for a suitable period of time, typically ranging from 5 minutes to 8 hours, at a temperature ranging from approximately 0–100° C. The mixing conditions should be sufficient to ensure uniform distribution of the reaction product and metal particles, and should not result in adverse effects, such as folding or breaking of the flakes, that will degrade the properties of the metal pigment particles, particularly the optical characteristics.

Alternatively, a metal pigment particle paste can be mixed with a solvent to form a slurry having about 1–40% by weight, preferably 10–30% by weight, of metal pigment particles. The salt or salt solution may be added in a quantity sufficient to provide 0.5–30%, preferably 1–15%, of salt with respect to the weight of metal particles. The mixture is agitated to ensure uniform distribution of the metal pigment particles without adversely affecting the metal particles. In this embodiment, agitation may take place at a temperature ranging from approximately 0–100° C., for a time period ranging from five minutes to 24 hours. Generally, the agitation time ranges from 30 minutes to two hours. Liquid may be removed from the mixture by a suitable means, such as, but not limited to, filtration, to obtain the desired paste. Typically, the paste may have a non-volatile content of approximately 50–80% by weight for the mixture.

A milling process may be employed to form the metal pigment particles. Typically, a ball mill is used. It is possible to treat the metal pigment particles with the reaction product as the particles are formed in the ball mill, as the reaction product is suitable for use with known milling lubricant systems. The salt can be dissolved in the milling lubricant prior to milling. Alternatively, the salt may be added to the lubricant during the milling process. As a result of treating the metal pigment particles during milling, the surface of the metal particles is stabilized as the particles are produced.

The metal particles also may be treated in-situ during the production of an aqueous coating composition. In this method, the salt or salt solution may be added to a coating composition before or after any water-containing component has been brought into contact with the metal pigment particles. The salt or salt solution may be added in a quantity sufficient to provide approximately 0.5–30%, preferably 1–15%, of salt with respect to the weight of metal particles. If the salt or salt solution is added after the metal pigment particles are brought into contact with the water-containing component, the delay in adding the reaction product should not be long. Generally, no more than 30 minutes should lapse between the time the pigment particles are brought into contact with the water-containing components and the reaction product is added, as a long delay would permit the water to attack the metal particles. Various mixing techniques may be employed in forming the coating composition. In one non-limiting example, the coating composition including the treated metal particles may be applied to the exterior of an automobile.

Also, dispersion may be formed by mixing a dispersion carrier with a composition including metal pigment particles treated with the reaction product. The dispersion carrier is a liquid at room temperature and should be compatible with a vehicle or carrier for later forming a coating composition. The dispersion carrier may be selected from plasticizers, solvents, resins, and oils. The metal pigment particles should be capable of remaining in a dispersed state in the dispersion without separation.

In any one of the methods described above, additional materials such as, but not limited to, surfactants, dispersants, anti-foaming agents, and rheology control agents can be used, as necessary. In addition, the treatments according to the present invention may be combined with other known treatment methods to increase the resistance of the metal pigment particles to attack from an aqueous medium including, but not limited to, the following: organic phosphates, phosphites, inorganic phosphates, phosphosilicates, molybdates, chromates, vanadates, heteropolyanions, and other compounds known to inhibit the reactivity of metal pigment particles with water.

The treated metal pigment particles and the pastes containing them may be used as direct replacements for currently available products in a variety of known coating and ink systems. Examples include maintenance, general industrial, roof coating, and automotive coating systems. These include, but are not limited to, the following: acrylic emulsions, water reducible alkyd resin systems, water reducible alkyl/melamine cross-linked systems, waterborne epoxy systems, polyester emulsions, and water reducible polyester/melamine coatings.

The present invention will be described further through the following examples, which are illustrative and non-limiting in nature.

EXAMPLES

Example 1

Tufflake® 3645, an aluminum pigment paste available from Silberline Manufacturing Co., Inc. having average particle size of 15.9 microns and a maximum of 0.01% by weight retained on a 325 mesh sieve, is charged into a mixer. Octyl (C8) phosphonic acid is added in the amount of 2.71% of the weight of aluminum metal. The materials are mixed for one hour.

Comparative Example 1

The Tufflake® 3645 paste of Example 1 is charged into a mixer. Isooctyl acid phosphate (a C8 phosphate ester) is added in the amount of 3.39% of the weight of aluminum metal, and the materials are mixed for one hour.

Example 2

Tufflake® 4700, an aluminum pigment paste available from Silberline Manufacturing Co., Inc. having an average particle size of 13.3 microns and a maximum of 0.10% by weight retained on a 325 mesh sieve, is charged into a mixer. Octadecyl (C18) phosphonic acid is added in the amount of 0.59% of the weight of aluminum metal, and the materials are mixed for one hour.

Example 3

The Tufflake® 4700 paste of Example 2 is charged into a mixer. Octyl (C8) phosphonic acid is added in the amount of 0.62% of the weight of aluminum metal, and the materials are mixed for one hour.

Comparative Example 2

The Tufflake® 4700 paste of Example 2 is charged into a mixer. Isooctyl acid phosphate is added in the amount of 1.00% of the weight of aluminum metal, and the materials are mixed for one hour.

Example 4

Sparkle Silver® 6246AR, an aluminum pigment paste available from Silberline Manufacturing Co., Inc. having an average particle size of 12.0 microns and a maximum of 0.01% by weight retained on a 325 mesh sieve, is charged into a mixer. Octadecyl (C18) phosphonic acid is added in the amount of 3.83% of the weight of aluminum metal (equivalent to 2.23 millimoles of POH acid groups per 100 grams of aluminum), and the materials are mixed for one hour.

Example 5

The Sparkle Silver® 6246AR paste of Example 3 is charged into a mixer. Lauryl (C12) phosphonic acid is added in the amount of 2.55% of the weight of aluminum metal (equivalent to 2.65 millimoles of POH acid groups per 100 grams of aluminum), and the materials are mixed for one hour.

Comparative Example 3

The Sparkle Silver® 6246AR paste of Example 3 is charged into a mixer. Propyl (C3) phosphonic acid is added in the amount of 0.64% of the weight of aluminum metal (equivalent to 2.70 millimoles of POH acid groups per 100 grams of aluminum), and the materials are mixed for one hour.

The aluminum pigment pastes from each of the above examples was incorporated into a waterborne polyurethane coating formulation such that the weight of the aluminum particles was equal to 14.4% of the weight of resin. Two hundred grams of each paint were weighed into a flask. The flask was placed in an oil bath maintained at a temperature of 50° C., and the evolved gas was collected in an inverted water-filled buret for a period of one week.

Additionally, a portion of some of the pastes was dispersed in mineral spirits and washed through a 325 mesh sieve. The material retained on the sieve was weighed and the amount retained calculated as a percentage of the weight of paste used. The data are summarized in Table 1.

C12–C14 produced by Rohm & Haas) in the ratio of 1.0 mole Primene 81-R to 1.0 mole octyl phosphonic acid. Tufflake® 4615 an aluminum pigment paste available from Silberline Manufacturing Co., Inc., having an average particle size of 12.7 microns and a maximum of 0.01% by weight retained on a 325 mesh sieve, is charged into a mixer. The product resulting from the reaction between the octyl phosphonic acid and Primene 81-R is added in a quantity such that the amount of octyl phosphonic acid is equivalent to 1.27% of the weight of aluminum metal. The materials are mixed for one hour.

Example 8

Octyl phosphonic acid is neutralized with Primene 81-R in the ratio of 1.5 moles Primene 81-R to 1.0 mole octyl phosphonic acid. The Tufflake® 4615 paste of Example 7 is charged into a mixer. The product resulting from the reaction between the octyl phosphonic acid and Primene 81-R is added in a quantity such that the amount of octyl phosphonic acid is equivalent to 1.56% of the weight of aluminum metal, and the materials are mixed for one hour.

TABLE 1

| | FEED | INHIBITOR | AMOUNT* | ORGANIC GROUP | mls. H2 evolved | % retained on 325 mesh |
|---|---|---|---|---|---|---|
| Ex. 1 | TF-3645 | octyl phosphonic acid | 2.71 | C8 | 9.00 | 1.10 |
| Comp. Ex. 1 | TF-3645 | isooctyl acid phosphate | 3.39 | C8 | 18.60 | <0.01 |
| Ex. 2 | TF-4700 | octadecyl phosphonic acid | 0.59 | C18 | 23.75 | 0.19 |
| Ex. 3 | TF-4700 | octyl phosphonic acid | 0.62 | C8 | 7.00 | 0.13 |
| Comp. Ex. 2 | TF-4700 | isooctyl acid phosphate | 1.00 | C8 | 37.95 | 0.01 |
| Ex. 4 | SS-6246AR | octadecyl phosphonic acid | 3.83 (2.23**) | C18 | 24.40 | — |
| Ex. 5 | SS-6246AR | lauryl phosphonic acid | 2.55 (2.65**) | C12 | 9.55 | — |
| Comp. Ex. 3 | SS-6246AR | propyl phosphonic acid | 0.64 (2.70**) | C3 | 146.00 | — |

*Weight percent, based on weight of aluminum
**Millimoles of POH acid groups per 100 grams aluminum The experimental data provided in Table 1 demonstrates that phosphonic acids are more effective than their comparable phosphate esters at reducing the amount of hydrogen gas that is evolved when the aluminum flakes are brought into contact with an aqueous medium. This remains true even when the phosphonic acids are used in lower amounts, even though they cause the aluminum flakes to aggregate. Additionally, the experimental data demonstrates that phosphonic acids having long chain organic groups are more effective than phosphonic acids having short chain organic groups at inhibiting the reactivation of a metal pigment with water.

Example 6

Octyl phosphonic acid is neutralized with Monazoline O (an alkylimidazoline cyclic tertiary amine whose longest organic group is C18 produced by Mona Industries) in the ratio of 1.4 moles Monazoline O to 1.0 mole octyl phosphonic acid. The Tufflake® 3645 paste of Example 1 is charged into a mixer. The product formed as a result of the reaction between the octyl phosphonic acid and Monazoline is added in a quantity such that the amount of octyl phosphonic acid is equivalent to 2.86% of the weight of aluminum metal. The materials are then mixed for one hour.

Example 7

Octyl phosphonic acid is neutralized with Primene 81-R (a mixture of tertiary alkyl primary amines in the range of

Example 9

Octyl phosphonic acid is neutralized with Primene 81-R in the ratio of 2.0 moles Primene 81-R to 1.0 mole octyl phosphonic acid. The Tufflake® 4615 paste of Example 7 is charged into a mixer. The product resulting from the reaction between the octyl phosphonic acid and Primene 81-R is added in a quantity such that the amount of octyl phosphonic acid is equivalent to 1.44% of the weight of aluminum metal, and the materials are mixed for one hour.

Example 10

Octyl phosphonic acid is neutralized with Primene JM-T (a mixture of tertiary alkyl primary amines in the range of C16–C22 produced by Rohm & Haas) in the ratio of 1.0 mole Primene JM-T to 1.0 mole octyl phosphonic acid. The Tufflake® 4615 paste of Example 7 is charged into a mixer. The product resulting from the reaction between the octyl phosphonic acid and Primene JM-T is added in a quantity such that the amount of octyl phosphonic acid is equivalent to 1.57% of the weight of aluminum metal, and the materials are mixed for one hour.

Example 11

Octyl phosphonic acid is neutralized with Primene JM-T in the ratio of 2.0 moles Primene JM-T to 1.0 mole octyl phosphonic acid. The Tufflake® 4615 paste of Example 7 is charged into a mixer. The product resulting from the reaction between the octyl phosphonic acid and Primene JM-T is added in a quantity such that the amount of octyl phosphonic acid is equivalent to 1.57% of the weight of aluminum metal, and the materials are mixed for one hour.

Comparative Example 4

Octyl phosphonic acid is neutralized with diethyl amine (a secondary amine whose longest organic group is C2) in the ratio of 2.0 moles diethyl amine to 1.0 mole octyl phosphonic acid. The Tufflake® 4615 paste of Example 7 is charged into a mixer. The product resulting from the reaction between the octyl phosphonic acid and the diethyl amine is added in a quantity such that the amount of octyl phosphonic acid is equivalent to 1.20% of the weight of aluminum metal, and the materials are mixed for one hour.

Comparative Example 5

Octyl phosphonic acid is neutralized with dimethylethanol amine (a tertiary amine whose longest organic group is C2) in the ratio of 2.0 moles dimethylethanol amine to 1.0 mole octyl phosphonic acid. The Tufflake® 4615 paste of Example 7 is charged into a mixer. The product resulting from the reaction between the octyl phosphonic acid and dimethylethanol amine is added in a quantity such that the amount of octyl phosphonic acid is equivalent to 1.40% of the weight of aluminum metal, and the materials are mixed for one hour.

Comparative Example 6

Octyl phosphonic acid is neutralized with tributyl amine (a tertiary amine whose longest organic group is C4) in the ratio of 2.0 moles tributyl amine to 1.0 mole octyl phosphonic acid. The Tufflake® 4615 paste of Example 7 is charged into a mixer. The product resulting from the reaction between the octyl phosphonic acid and tributyl amine is added in a quantity such that the amount of octyl phosphonic acid is equivalent to 1.56% of the weight of aluminum metal, and the materials are mixed for one hour.

Comparative Example 7

The Tufflake® 4615 paste of Example 7 is charged into a mixer. Isooctyl acid phosphate is added in the amount of 1.70% of the weight of aluminum metal, and the materials are mixed for one hour.

Five grams of the aluminum pigment paste from each of the above examples was dispersed in mineral spirits and washed through a 325 mesh sieve. The material retained on the sieve was weighed, and the amount retained calculated as a percentage of the weight of paste used. Some of the aluminum pigment pastes were retested in the same manner after one year. Additionally, a portion of some of the pastes was incorporated into the proprietary waterborne polyurethane coating formulation and tested for gas evolution, as described above. The data are summarized in Table 2.

TABLE 2

COMPARISON OF NEUTRALIZED OCTYL PHOSPHONIC ACID PRODUCTS

| | FEED | AMINE | LONGEST AMINE ORGANIC GROUP | AMINE: ACID RATIO | % retained on 325 mesh INITIAL | % retained on 325 mesh 1 YEAR | mls. H2 evolved |
|---|---|---|---|---|---|---|---|
| Ex. 1 | TF-3645 | None | None | N/A | 1.10 | — | 9.00 |
| Ex. 6 | TF-3645 | Monazoline O | C18 | 1.4:10 | <0.01 | — | 10.20 |
| Ex. 7 | TF-4615 | Primene 81-R | C12–14 | 1.0:1.0 | <0.01 | <0.01 | — |
| Ex. 8 | TF-4615 | Primene 81-R | C12–14 | 1.5:1.0 | <0.01 | <0.01 | 18.90 |
| Ex. 9 | TF-4615 | Primene 81-R | C12–14 | 2.0:1.0 | <0.01 | <0.01 | 14.95 |
| Ex. 10 | TF-4615 | Primene JM-T | C16–22 | 1.0:1.0 | <0.01 | 0.01 | 16.05 |
| Ex. 11 | TF-4615 | Primene JM-T | C16–22 | 2.0:1.0 | <0.01 | <0.01 | 14.05 |
| Comp. Ex. 4 | TF-4615 | diethyl amine | C2 | 2.0:1.0 | 1.95 | — | — |
| Comp. Ex. 5 | TF-4615 | dimethylethanol amine | C2 | 2.0:1.0 | 2.30 | — | — |
| Comp. Ex. 6 | TF-4615 | tributyl amine | C4 | 2.0:1.0 | 2.94 | — | — |
| Comp. Ex. 7* | TF-4615 | None | None | N/A | <0.01 | 0.13 | 34.00 |

*This example has isooctyl acid phosphate, rather than octyl phosphonic acid

As demonstrated by the experimental data provided in Table 2, a phosphonic acid neutralized with an amine containing a long chain organic component is much less likely to cause aggregation of the aluminum flakes than a phosphonic acid neutralized with an amine containing a short chain organic component. Additionally, neutralization of the phosphonic acid does not impair its effectiveness at reducing the amount of gas evolved when the metal pigment particles are contacted with an aqueous medium when compared to an organic phosphate ester.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of treating metal pigment particles for inhibiting their reaction with water, comprising:
    contacting a composition comprising metal pigment particles with a salt having the following formula

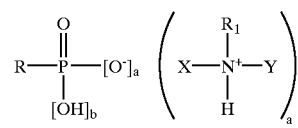

wherein a ranges from 0.25 to 2.0,
    b ranges from 0.0 to 1.75, and a+b=2.0,
    R is selected from the group consisting of alkyl, alkenyl, alkynyl, aryl, and alkylaryl and comprises at least 6 carbon atoms;

R₁ comprises at least six carbon atoms and is selected from the group consisting of alkyl, alkenyl, alkynyl, aryl, and alkylaryl; and X and Y are each independently either hydrogen or a moiety having from 1 to 20 carbon atoms selected from the group consisting of alkyl, alkenyl, alkynyl, aryl, and alkylaryl.

2. The method according to claim 1, wherein R further comprises at least one functional group selected from the group consisting of hydroxyl, carbonyl, carboxyl, epoxy, ether, amino, nitro, nitrile, thio, silyl, sulfo, phosphato and halo.

3. The method according to claim 1, wherein at leas one of X and Y is the moiety having from 1 to 20 carbon atoms and further comprises at least one functional group selected from the group consisting of hydroxyl, carbonyl, carboxyl, epoxy, ether, amino, nitro, nitrile, thio, silyl, sulfo, phosphate and halo.

4. The method according to claim 1, wherein $R_1$ comprises at least eight carbon atoms.

5. The method according to claim 1, wherein $R_1$ further comprises at least one functional group selected from the group consisting of hydroxyl, carbonyl, carboxyl, epoxy, ether, amino, nitro, nitrile, thio, silyl, sulfo, phosphato and halo.

6. The method according to claim 1, wherein a ranges from 1.0 to 2.0.

7. The method according to claim 1, wherein b ranges from 0.0 to 1.0.

8. The method according to claim 1, wherein the salt is added neat.

9. The method according to claim 1, wherein the salt is added as a solution, the solution comprising the salt and a solvent that is miscible with water.

10. The method according to claim 1, wherein the metal pigment particles are aluminum, zinc, or bronze particles.

11. The method according to claim 10, wherein the metal pigment particles are aluminum.

12. The method according to claim 1, wherein the metal pigment particles have a particle size ranging from 1 to 500 microns.

13. The method according to claim 1, wherein the metal pigment particles have a particle size ranging from 5 to 100 microns.

14. The method according to claim 1, wherein the metal pigment particles are in flake form.

15. The method according to claim 1, wherein the metal pigment particles are in a paste comprising 55 to 95% by weight metal particles.

16. The method according to claim 15, wherein the paste comprises 60 to 85% by weight metal pigment particles.

17. The method according to claim 1, wherein the metal particles are in a slurry comprising 1 to 40% by weight metal pigment particles.

18. The method according to claim 17, wherein the slurry comprises 10 to 30% by weight metal pigment particles.

19. The method according to claim 1, wherein the amount of salt added ranges from 0.5 to 30% with respect to the weight of the metal pigment particles.

20. The method according to claim 1, wherein the amount of salt added ranges from 1 to 15% with respect to the weight of the metal pigment particles.

21. The method according to claim 1, wherein the salt and the metal pigment particles are agitated at a temperature ranging from 0 to 100° C.

22. A method of method of making a coating composition, comprising adding metal pigment particles and a salt having the following formula to an aqueous coating composition carrier

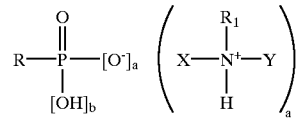

wherein a ranges from 0.25 to 2.0, b ranges from 0.0 to 1.75, and a+b=2.0,

R is selected from the group consisting of alkyl, alkenyl, alkynyl, aryl, and alkylaryl and comprises at least 6 carbon atoms;

$R_1$ comprises at least six carbon atoms and is selected from the group consisting of alkyl, alkenyl, alkynyl, aryl, and alkylaryl; and X and Y are each independently either hydrogen or a moiety having from 1 to 20 carbon atoms selected from the group consisting of alkyl, alkenyl, alkynyl, aryl, and alkylaryl.

23. The method according to claim 22, wherein R further comprises at least one functional group selected from the group consisting of hydroxyl, carbonyl, carboxyl, epoxy, ether, amino, nitro, nitrile, thio, silyl, sulfo, phosphate and halo.

24. The method according to claim 22, wherein at least one of X and Y is the moiety having from 1 to 20 carbon atoms and further comprises at least one functional group selected from the group consisting of hydroxyl, carbonyl, carboxyl, epoxy, ether, amino, nitro, nitrile, thio, silyl, sulfo, phosphate and halo.

25. The method according to claim 22, wherein a ranges from 1.0 to 2.0.

26. The method according to claim 22, wherein b ranges from 0.0 to 1.0.

27. The method according to claim 22, wherein $R_1$ comprises at least eight carbon atoms.

28. The method according to claim 22, wherein $R_1$ further comprises at least one functional group selected from the group consisting of hydroxyl, carbonyl, carboxyl, epoxy, ether, amino, nitro, nitrile, thio, silyl, sulfo, phosphate and halo.

29. The method according to claim 22, wherein the salt is added first.

30. The method according to claim 22, wherein the salt is added after the metal pigment particles are added.

31. The method according to claim 30, wherein the salt is added within 30 minutes of contacting the metal pigment particles with water contained in any component of the coating composition.

32. The method according to claim 22, wherein the metal pigment particles are aluminum, zinc, or bronze particles.

33. The method according to claim 32, wherein the metal pigment particles are aluminum.

34. The method according to claim 22, wherein the metal pigment particles have a particle size ranging from 1 to 500 microns.

35. The method according to claim 22, wherein the metal pigment particles have a particle size ranging from 5 to 100 microns.

36. The method according to claim 22, wherein the metal pigment particles are spherical or are in flake form.

37. The method according to claim 22, wherein the amount of salt added ranges from 0.5 to 30% with respect to the weight of the metal pigment particles.

38. The method according to claim 22, wherein the amount of salt added ranges from 1 to 15% with respect to the weight of the metal pigment particles.

39. A method of treating metal pigment particles for inhibiting their reaction with water, comprising milling the particles with a salt having the following formula dissolved in a lubricant

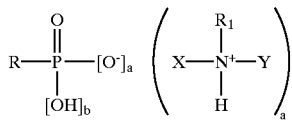

wherein a ranges from 0.25 to 2.0,
b ranges from 0.0 to 1.75, and a+b=2.0,
R is selected from the group consisting of alkyl, alkenyl, alkynyl, aryl, and alkylaryl and comprises at least 6 carbon atoms;
$R_1$ comprises at least six carbon atoms and is selected from the group consisting of alkyl, alkenyl, alkynyl, aryl, and alkylaryl; and
X and Y are each independently either hydrogen or a moiety having from 1 to 20 carbon atoms selected from the group consisting of alkyl, alkenyl, alkynyl, aryl, and alkylaryl.

40. The method according to claim 39, wherein R further comprises at least one functional group selected from the group consisting of hydroxyl, carbonyl, carboxyl, epoxy, ether, amino, nitro, nitrile, thio, silyl, sulfo, phosphato and halo.

41. The method according to claim 39, wherein at least one of X and Y is the moiety having from 1 to 20 carbon atoms and further comprises at least one functional group selected from the group consisting of hydroxyl, carbonyl, carboxyl, epoxy, ether, amino, nitro, nitrile, thio, silyl, sulfo, phosphato and halo.

42. The method according to claim 39, wherein a ranges from 1.0 to 2.0.

43. The method according to claim 39, wherein b ranges from 0.0 to 1.0.

44. The method according to claim 39, wherein $R_1$ comprises at least eight carbon atoms.

45. The method according to claim 39, wherein $R_1$ further comprises at least one functional group selected from the group consisting of hydroxyl, carbonyl, carboxyl, epoxy, ether, amino, nitro, nitrile, thio, silyl, sulfo, phosphato and halo.

46. A coating composition comprising:
a metal pigment particles treated with a salt having the following formula for inhibiting their reaction with water

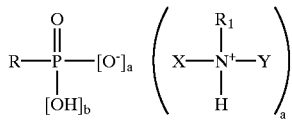

wherein a ranges from 0.25 to 2.0,
b ranges from 0.0 to 1.75, and a+b=2.0,
R is selected from the group consisting of alkyl, alkenyl, alkynyl, aryl, and alkylaryl and comprises at least 6 carbon atoms;
$R_1$ comprises at least six carbon atoms and is selected from the group consisting of alkyl, alkenyl, alkynyl, aryl, and alkylaryl; and
X and Y are each independently either hydrogen or a moiety having from 1 to 20 carbon atoms selected from the group consisting of alkyl, alkenyl, alkynyl, aryl, and alkylaryl; and
b) a carrier.

47. The coating composition according to claim 46, wherein R further comprises at least one functional group selected from the group consisting of hydroxyl, carbonyl, carboxyl, epoxy, ether, amino, nitro, nitrile, thio, silyl, sulfo, phosphato and halo.

48. The coating composition according to claim 46, wherein at least one of X and Y is the moiety having from 1 to 20 carbon atoms and further comprises at least one functional group selected from the group consisting of hydroxyl, carbonyl, carboxyl, epoxy, ether, amino, nitro, nitrile, thio, silyl, sulfo, phosphate and halo.

49. The coating composition according to claim 46, wherein a ranges from 1.0 to 2.0.

50. The coating composition according to claim 46, wherein b ranges from 0.0 to 1.0.

51. The coating composition according to claim 46, wherein $R_1$ comprises at least eight carbon atoms.

52. The coating composition according to claim 46, wherein $R_1$ further comprises at least one functional group selected from the group consisting of hydroxyl, carbonyl, carboxyl, epoxy, ether, amino, nitro, nitrile, thio, silyl, sulfo, phosphato and halo.

53. The coating composition according to claim 46, wherein the metal pigment particles are aluminum, zinc, or bronze particles.

54. The coating composition according to claim 53, wherein the metal pigment particles are aluminum.

55. The coating composition according to claim 46, wherein the metal pigment particles have a particle size ranging from 1 to 500 microns.

56. The coating composition according to claim 46, wherein the metal pigment particles have a particle size ranging from 5 to 100 microns.

57. The coating composition according to claim 46, wherein the metal pigment particles are spherical or are in flake form.

58. A metallic paste comprising:
metal pigment particles treated with a salt having the following formula to inhibit their reaction with water

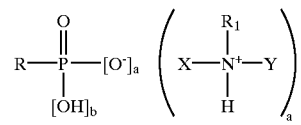

wherein a ranges from 0.25 to 2.0,
b ranges from 0.0 to 1.75, and a+b=2.0,
R is selected from the group consisting of alkyl, alkenyl, alkynyl, aryl, and alkylaryl and comprises at least 6 carbon atoms;
$R_1$ comprises at least six carbon atoms and is selected from the group consisting of alkyl, alkenyl, alkynyl, aryl, and alkylaryl; and
X and Y are each independently either hydrogen or a moiety having from 1 to 20 carbon atoms selected from the group consisting of alkyl, alkenyl, alkynyl, aryl, and alkylaryl; and
a liquid for forming the paste.

59. The metallic paste according to claim 58, wherein R further comprises at least one functional group selected from the group consisting of hydroxyl, carbonyl, carboxyl, epoxy, ether, amino, nitro, nitrile, thio, silyl, sulfo, phosphato and halo.

60. The metallic paste according to claim 58, wherein at least one of X and is Y the moiety having from 1 to 20 carbon atoms further comprises at least one functional group selected from the group consisting of hydroxyl, carbonyl, carboxyl, epoxy, ether, amino, nitro, nitrile, thio, silyl, sulfo, phosphato and halo.

61. The metallic paste according to claim 58, wherein a ranges from 1.0 to 2.0.

62. The metallic paste according to claim 58, wherein b ranges from 0.0 to 1.0.

63. The metallic paste according to claim 58, wherein $R_1$ comprises at least eight carbon atoms.

64. The metallic paste according to claim 58, wherein $R_1$ further comprises at least one functional group selected from the group consisting of hydroxyl, carbonyl, carboxyl, epoxy, ether, amino, nitro, nitrile, thio, silyl, sulfo, phosphato and halo.

65. The metallic paste according to claim 58, wherein the metal pigment particles are aluminum, zinc, or bronze particles.

66. The metallic paste according to claim 58, wherein the metal pigment particles are aluminum.

67. The metallic paste according to claim 58, wherein the metal pigment particles have a particle size ranging from 1 to 500 microns.

68. The metallic paste according to claim 58, wherein the metal pigment particles have a particle size ranging from 5 to 100 microns.

69. The metallic paste according to claim 58, wherein the metal pigment particles are spherical or are in flake form.

70. A method of making a coating composition, comprising mixing the paste of claim 58 with a carrier to form the coating composition.

71. An automobile comprising a metal surface coated with the coating composition according to claim 46.

72. A metal pigment particle dispersion for forming metal pigment particle-containing coating compositions, comprising:
a) metal pigment particles treated with a salt having the following formula to inhibit their reaction with water

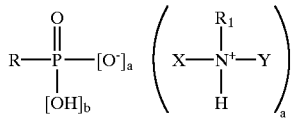

wherein a ranges from 0.25 to 2.0, b ranges from 0.0 to 1.75, and a+b=2.0,

R is selected from the group consisting of alkyl, alkenyl, alkynyl, aryl, and alkylaryl and comprises at least 6 carbon atoms;

$R_1$ comprises at least six carbon atoms and is selected from the group consisting of alkyl, alkenyl, alkynyl, aryl, and alkylaryl, and X and Y are each independently either hydrogen or a moiety having from 1 to 20 carbon atoms selected from the group consisting of alkyl, alkenyl, alkynyl, aryl, and alkylaryl, and b) a dispersion carrier for the metal pigment particles, the dispersion carrier being liquid at room temperature and compatible with a vehicle for forming a coating composition wherein, the metal pigment particles are capable of remaining in a dispersed state in the dispersion substantially without separation.

73. The dispersion according to claim 72, wherein R further comprises at least one functional group selected from the group consisting of hydroxyl, carbonyl, carboxyl, epoxy, ether, amino, nitro, nitrile, thio, silyl, sulfo, phosphate and halo.

74. The dispersion according to claim 72, wherein at least one of X and Y is the moiety having from 1 to 20 carbon atoms and further comprises at least one functional group selected from the group consisting of hydroxyl, carbonyl, carboxyl, epoxy, ether, amino, nitro, nitrile, thio, silyl, sulfo, phosphato and halo.

75. A method of making a metal pigment particle dispersion for forming a metal pigment particle containing coating composition, comprising:
mixing a composition comprising metal pigment particles treated with a salt having the following formula to inhibit their reaction with water with a dispersion carrier, the dispersion carrier being liquid at room temperature and compatible with a vehicle for forming a coating composition

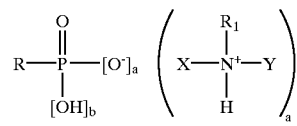

wherein a ranges from 0.25 to 2.0, b ranges from 0.0 to 1.75, and a+b=2.0,

R is selected from the group consisting of alkyl, alkenyl, alkynyl, aryl, and alkylaryl and comprises at least 6 carbon atoms;

$R_1$ comprises at least six carbon atoms and is selected from the group consisting of alkyl, alkenyl, alkynyl, aryl, or alkylaryl, and X and Y are each independently either hydrogen or a moiety having from 1 to 20 carbon atoms selected from the group consisting of alkyl, alkenyl, alkynyl, aryl, and alkylaryl.

76. The method according to claim 75, wherein R further comprises at least one functional group selected from the group consisting of hydroxyl, carbonyl, carboxyl, epoxy, ether, amino, nitro, nitrile, thio, silyl, sulfo, phosphato and halo.

77. The method according to claim 75, wherein at least one of X and Y is the moiety having from 1 to 20 carbon atoms and further comprises at least one functional group selected from the group consisting of hydroxyl, carbonyl, carboxyl, epoxy, ether, amino, nitro, nitrile, thio, silyl, sulfo, phosphato and halo.

* * * * *

UNITED STATES PATENT AND TRADEMARK OFFICE
CERTIFICATE OF CORRECTION

PATENT NO. : 6,863,718 B2  Page 1 of 1
APPLICATION NO. : 10/004486
DATED : March 8, 2005
INVENTOR(S) : Lamborn et al.

It is certified that error appears in the above-identified patent and that said Letters Patent is hereby corrected as shown below:

Column 10,
Line 25, Table 2, Ex. 6: "1.4:10" should read -- 1.4.1.0 --.

Column 11,
Line 13, "leas" should read -- least --.

Column 13,
Line 50, "a metal" should read -- a) metal --.

Signed and Sealed this

Twentieth Day of June, 2006

JON W. DUDAS
*Director of the United States Patent and Trademark Office*